ABSTRACT

United States Patent [19]

Armour

[11] 4,299,752

[45] Nov. 10, 1981

[54] METALLIC POLYMERIC DISPERSION COATING COMPOSITION

[75] Inventor: Albert G. Armour, Tervuren, Belgium

[73] Assignee: E. I. Du Pont de Nemours and Company, Wilmington, Del.

[21] Appl. No.: 966,257

[22] Filed: Dec. 4, 1978

Related U.S. Application Data

[63] Continuation-in-part of Ser. No. 536,324, Dec. 24, 1974, abandoned, which is a continuation-in-part of Ser. No. 335,119, Feb. 23, 1973, abandoned, which is a continuation-in-part of Ser. No. 162,651, Jul. 14, 1971, abandoned, which is a continuation-in-part of Ser. No. 889,679, Dec. 31, 1969, abandoned, which is a continuation-in-part of Ser. No. 632,195, Apr. 20, 1967, abandoned.

[51] Int. Cl.$^3$ ............................................. C08K 5/10
[52] U.S. Cl. ............................. 260/31.4 R; 260/31.6; 260/32.8 R; 260/33.2 R
[58] Field of Search ............ 260/31.4 R, 31.6, 31.8 G, 260/31.8 H, 32.8 R, 42.22, 33.2 R

[56] References Cited

U.S. PATENT DOCUMENTS 3,298,990 1/1967 Cousens ............................. 260/31.6
3,446,769 5/1969 Opipari ............................... 260/31.4

FOREIGN PATENT DOCUMENTS 967051 8/1964 United Kingdom .

*Primary Examiner*—Paul R. Michl

[57] ABSTRACT

A liquid metallic pigmented coating composition, which produces excellent metallic glamor when it is applied to a substrate and subsequently dried, is provided. The liquid coating composition of this invention is a polymeric dispersion wherein the dispersed phase comprises polymer formed from ethylenically unsaturated monomers and metallic pigmentation and wherein the continuous phase comprises (1) an organic liquid which is a non-solvent for the dispersed phase, and (2) a coalescing solvent for the dispersed polymer.

5 Claims, No Drawings

METALLIC POLYMERIC DISPERSION COATING COMPOSITION

CROSS REFERENCE TO RELATED APPLICATIONS

This application is a Continuation-In-Part of copending application Ser. No. 536,324, filed Dec. 24, 1974, now abandoned; application Ser. No. 536,324 is a Continuation-In-Part of application Ser. No. 335,119, filed Feb. 23, 1973 and now abandoned; application Ser. No. 335,119 is a Continuation-In-Part of application Ser. No. 162,651, filed July 14, 1971 and now abandoned; application Ser. No. 162,651 is a Continuation-In-Part of application Ser. No. 889,679, filed Dec. 31, 1969 and now abandoned; and application Ser. No. 889,679 is a Continuation-In-Part of application Ser. No. 632,195, filed Apr. 20, 1967 and now abandoned.

BACKGROUND OF THE INVENTION

This invention concerns a metallic pigmented polymeric dispersion which, when it is applied to a substrate and dried, results in a dry coating having excellent metallic glamor upon the substrate. Metallic glamor or metallic two-tone are interchangeable and synonymous terms used in the coating art to indicate that property of a metallic pigmented coating which causes the intensity of light reflected from the coated substrate to vary markedly according to the angle from which it is observed. Excellent metallic glamor is a very desirable property for many coating applications and especially for automobile finishes. This is especially so since many people find that coatings exhibiting metallic glamor are more asthetically desirable than ones that do not exhibit metallic glamor.

Previously, it has been difficult and in many cases impossible to achieve good metallic glamor in coatings formed by spraying a metallic pigmented organosol onto a substrate and subsequently evaporating the continuous phase of the organosol. For purposes of this invention, the term organosol is used to mean a dispersion of a polymeric material in an organic liquid. The polymeric material is referred to as the dispersed phase and the organic liquid is the continuous phase. Organosols can also contain polymeric dispersing agents.

SUMMARY OF THE INVENTION

According to this invention, there is provided a metallic pigmented organosol composition having a dispersed phase and a continuous phase, the organosol composition being suitable for forming a metallic pigmented dry coating upon a substrate which coating has excellent metallic glamor. This organosol comprises:
(A) A dispersed phase comprising a polymer which is a homopolymer or copolymer of ethylenically unsaturated monomers and metallic flake pigmentation;
(B) A continuous phase comprising:
  (1) at least one volatile organic liquid, said liquid being a nonsolvent for the dispersed phase; and
  (2) at least one coalescing solvent which is an organic liquid, said coalescing solvent being a solvent for the dispersed polymer and being miscible in the volatile organic liquid.

The coalescing solvent is further characterized as having:
  1. A nonsolvent tolerance of from about 20 to about 70; and
  2. An evaporation rate of less than about 0.5 times the evaporation rate of the volatile organic liquid.

The coalescing solvent should be present in the organosol composition in an amount of from about 0.6 to about 2.5 parts by weight of coalescing solvent per parts by weight of the dispersed polymer.

The volatile organic liquid is present in an amount sufficient to keep the polymer in the dispersed phase.

There is also provided by this invention a process for obtaining improved metallic glamor in dry coatings formed from metallic pigmented organosol dispersions, which process comprises:
  1. Applying the above liquid metallic pigmented organosol dispersion which contains a coalescing solvent as described above to a substrate; and
  2. Evaporating the continuous phase of the liquid dispersion wherein a dry coating having excellent metallic glamor is formed upon the substrate.

This invention has the advantage of achieving excellent metallic glamor from metallic pigmented polymeric dispersions while still retaining the major benefit of dispersion finishes, high spray solids. Other advantages of this invention are that the use of a coalescing solvent imparts improved room temperature coalescence to the dispersion and results in a dry finish coating having improved adhesion to the substrate, both of which are desirable properties in dispersion coatings.

DESCRIPTION

For purposes of this invention, the polymeric component in the dispersed phase of suitable organosols comprises homopolymers or copolymers formed from monomers having at least one ethylenically unsaturated valence bond. These polymers can be either thermoplastic or thermosetting. Some examples of monomers suitable for preparation of the dispersed polymer phase include vinyl esters of fatty acids having 1–18 carbon atoms including vinyl oleate and vinyl stearate. Esters of acrylic acid or of methacrylic acid from alcohols having from 1–18 carbon atoms can likewise be employed. More examples of suitable monomers include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Illustrative of other suitable monomers are acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, N-t-butylaminoethyl methacrylate, N,N-dimethyl or N,N-diethylaminoethyl methacrylate, hydroxyalkyl acrylates and methacrylates such as β-hydroxyethyl methacrylate, β-hydroxyethyl vinyl ether, β-hydroxyethyl vinyl sulfide, and vinyl pyrrolidone.

Any polymer formed from the above-described monomers is suitable for this invention if it is insoluble in the particular volatile organic liquid being used and soluble in the particular coalescing solvent employed.

The metallic pigmentation in the dispersed phase can be any flat metallic flake. Examples of suitable flakes include aluminum flakes, nickel flakes, tin flakes, silver flakes, chromium flakes, stainless steel flakes, gold flakes, copper flakes and combinations of these.

Volatile organic liquids suitable for use in the continuous phase in the organosols of this invention can vary widely. In general, such volatile organic liquids will be an organic liquid or a mixture of such liquids that is a nonsolvent for the dispersed polymer. These volatile organic liquids can be acyclic or alicyclic aliphatic hydrocarbons, aromatic hydrocarbons or naphthenic hydrocarbons. Other suitable organic liquids include alcohols, esters, ethers, acids, ketones, amides and sulfoxides. The organic liquids can have a boiling range of from about −50° C. to as high as about 300° C. The boiling point or boiling range of the organic liquids can be chosen as desired for the particular application for which the organosol is to be used. Examples of organic liquids suitable for use as the continuous phase include pentane, n-hexane, cyclohexane, n-heptane, n-octane, iso-octane, benzene, toluene, xylene (o-, m- or p-xylene). In addition, commercially available hydrocarbon mixtures can be employed including mineral spirits, gasoline, xylene mixtures, solvent naphthas of aromatic, aliphatic and naphthenic character, alkyl benzenes in which the alkyl group or groups have from one to four carbon atoms, octane fractions which contain a mixture of octane isomers, etc., and mixtures of these.

For a more detailed description of the formation and one type of organosols which are suitable for use with the present invention, see U.S. Pat. Nos. 3,166,524, issued Jan. 19, 1965, and 3,232,903, issued Feb. 1, 1966.

As has already been pointed out above, the need existed to obtain good metallic glamor in polymeric metallic coatings formed by the application of metallic pigmented organosols to substrates with subsequent evaporation of the continuous phase. The organosol compositions of this invention include a coalescing solvent to improve the metallic glamor of the dry coating formed from these compositions upon a substrate.

In addition, this invention utilizes volatile organic liquid nonsolvents, wherein there exists a specific evaporation rate relationship between the coalescing solvent and the volatile nonsolvent.

The usefulness of any particular coalescing solvent depends upon its solvency, its evaporation rate compared to the evaporation rate of the volatile organic liquid and upon the amount of coalescing solvent present. These factors are further described separately.

A method for determining the solvency tolerance of any coalescing solvent is as follows. This method involves the titration with the nonsolvent volatile organic liquid of a solution of five parts by weight of the polymer to be dispersed in 100 parts by weight of the coalescing solvent being examined. The quantity of nonsolvent volatile organic liquid, expressed in parts by weight, required for the initial precipitation of the dissolved polymer is designated as the nonsolvent tolerance of the particular coalescing solvent being examined.

This method can be further illustrated by the titration of a clear solution of five parts by weight of polymethyl methacrylate dissolved in 100 parts by weight of various coalescing solvents with pure hexane which can be used as nonsolvent volatile organic liquid. Using this technique, the nonsolvent tolerance values for representative coalescing solvents are shown in Table I.

TABLE I

| COALESCING SOLVENT | NONSOLVENT TOLERANCE |
|---|---|
| 2,2,4-Trimethylpentane-1,3-diol monoisobutyrate monoacetate | 0 |
| Diethylene glycol monobutyl ether | 0 |
| Ethylene glycol monoethyl ether | 0 |
| Diethylene glycol monobutyl ether acetate | 38 |
| Ethylene glycol monobutyl ether acetate | 42 |
| Ethylene glycol monoethyl ether acetate | 64 |
| Acetone | 92 |

If an eighty/twenty weight percent methyl methacrylate/ethyl acrylate copolymer is the polymer which is dispersed, the nonsolvent tolerance values, determined by the same procedure, are shown in Table II.

TABLE II

| COALESCING SOLVENT | NONSOLVENT TOLERANCE |
|---|---|
| 2,2,4-Trimethylpentane-1,3-diol monoisobutyrate monoacetate | 0 |
| Diethylene glycol monobutyl ether | 0 |
| Ethylene glycol monethyl ether | 48 |
| Diethylene glycol monobutyl ether acetate | 54 |
| Ethylene glycol monobutyl ether acetate | 62 |
| Ethylene glycol monoethyl ether acetate | 78 |
| Acetone | 72 |

The level of metallic glamor obtained in a dry coating is directly related to the nonsolvent tolerance value of the coalescing solvent present in the organosol composition. Good metallic glamor can be obtained using coalescing solvents with nonsolvent tolerance values ranging from about 20 to about 70. Below a value of about 20, the coalescing solvent is not a strong enough solvent for the dispersed polymer. Above values of about 70, the coalescing solvent is such a strong solvent for the dispersed polymer that it tends to coagulate the dispersion which results in a dry coating with poor surface aesthetics. Excellent metallic glamor is obtained using coalescing solvents with nonsolvent tolerance values of from about 40 to about 60.

It is important to realize that even though a particular coalescing solvent does not work well for one polymer dispersion system, it might work very well for another. For instance, a coalescing solvent might have a nonsolvent tolerance value of zero for one particular polymer dispersion, but with another polymer dispersion the same coalescing solvent might have a nonsolvent tolerance value within the range which results in good metallic glamor in the dry coating formed. This is illustrated by the coalescing solvent ethylene glycol monoethyl ether which has a nonsolvent tolerance value of zero for the polymer dispersion of Table I and a nonsolvent tolerance value of 48 for the polymer dispersion of Table II. In like manner, a particular coalescing solvent might have a nonsolvent tolerance value which is too high to result in good metallic glamor for one polymer dispersion, and yet is within the allowable values for another polymer dispersion. In other words, the nonsolvent tolerance value for a particular coalescing solvent is a relative term, and must always be used only in conjunction with the specific polymer dispersion for which the value has been determined.

The terms "solvent" and "nonsolvent" are, of course, relative terms. Unless otherwise specified, they are used in their normal usage for this invention as defined by any reputable chemical dictionary, such as The Condensed Chemical Dictionary, 6th edit., Reinhold, 1961.

The evaporation rate is another factor which must be considered in the selection of a coalescing solvent. The coalescing solvent should have an evaporation rate of less than 0.5 times the evaporation rate of the nonsolvent volatile organic liquid when both are measured at the temperature at which the organosol composition is applied to the substrate. For optimum results, the evaporation rate of the coalescing solvent should be less than 0.06 times the evaporation rate of the nonsolvent volatile organic liquid.

Another important factor to be considered is the amount of coalescing solvent used in the organosol composition. As might be expected, this is related directly to the amount of dispersed phase present. Suitable metallic glamor is obtained when the total amount of coalescing solvent is present in an amount between 0.6 and 2.5 parts by weight coalescing solvent per parts by weight of the dispersed polymer.

Upon spray application of the metallic pigmented organosol composition of this invention, the volatile nonsolvent of the continuous phase evaporates very rapidly. The rate of evaporation of the nonsolvent is such that the polymer, which is in the dispersed phase as it leaves the nozzle of the spray applicator, arrives at the surface of the substrate as a solution (in the coalescing solvent). This allows free orientation of the metallic pigment and results, upon drying, in the sought after glamor.

The coatings based upon the compositions of this invention, having good metallic glamor, have achieved commercial success in the automotive industry.

Normally a small amount of the coalescing solvent is added during the initial formation of the organosol with the remainder being added at a later time. This is not necessary, however, and the whole amount can be added initially, after the organosol is formed, or split into two or more portions, whichever is most convenient.

Many of the commonly known solvents are suitable for use as a coalescing solvent in this invention. Examples of some solvents which are useful include:

2,2,4-Trimethylpentane-1,3-diol monoisobutyrate monoacetate
Diethylene glycol monobutyl ether
Ethylene glycol monoethyl ether
Diethylene glycol monobutyl ether acetate
Ethylene glycol monobutyl ether acetate
Ethylene glycol monoethyl ether acetate
Acetone The second through the sixth of these are commercially available from the Union Carbide Co. under the respective trademarks "Butyl Carbitol", "Cellosolve", "Butyl Carbitol Acetate", "Butyl Cellosolve Acetate", and "Cellosolve Acetate". As has already been pointed out above, any solvent which meets the nonsolvent tolerance and evaporation rate requirements is suitable for use as the coalescing solvent of this invention.

Metallic glamor can be objectively measured with a goniophotometer, using the following geometrical arrangement. A coated test panel is positioned in a horizontal position with the coated side on top. Two photocells are positioned at angles of $+15°$ and $+80°$ and a light source is positioned at $+20°$ behind a filter. All of these angles are measured from the verticle in a clockwise direction. The ratio of the intensity measured at $+15°$ to that measured at $+80°$ is the two-tone ratio.

The light source, filter and photocell combination used has a spectral response which corresponds to the C.I.E. standard observer for illuminant C. Electrical compensation of the photocell circuit is provided so that the two-tone ratio for nonmetallic coating reflectance standards, which closely follow the Lambert Cosine law of diffuse relectance, is equal to 1.0. For metallic coatings, the ratio is greater than 1.0, and for samples of similar color, the larger the ratio, the greater is the metallic glamor or two-tone appearance. This procedure has been found to yield numerical readings which correlate well with visual ratings of metallic glamor.

The preferred embodiment of this invention comprises a pigmented metallic organosol composition which contains a coalescing solvent which has a nonsolvent tolerance value of from about 40 to about 60, an evaporation rate of less than about 0.06 times the evaporation rate of the nonsolvent volatile organic liquid and which is present in the amount of from about 1.2 to about 2.5 parts by weight coalescing solvent per parts by weight of the dispersed polymer of the organosol. The nonsolvent volatile organic liquid is present in sufficient amounts to keep the polymer in dispersion. Such an organosol composition results, upon application to a substrate and subsequent evaporation of the continuous phase, in a dry coating upon the substrate which coating has excellent metallic glamor.

Normally a small improvement in metallic glamor can be obtained by merely lowering the spray solids of the organosol composition. However, it is important to note that the improvement in metallic glamor in a dry coating obtained from the use of this invention is not realized if a high-boiling liquid which is not a solvent for the dispersed polymer is added to an organosol. In fact, the resulting metallic appearance is usually not significantly improved and in most cases is poorer because flooding and mottling occur. As was pointed out above, a high rate of evaporation of the nonsolvent is necessary so that the polymer can arrive at the surface to be coated in substantially solution form.

This invention is useful for improving the surface aesthetics of a dry metallic coating by increasing the amount of metallic glamor obtained in a dry coating formed by applying a metallic pigmented organosol coating composition to a substrate and subsequently evaporating the continuous phase of the organosol composition.

The following examples illustrate the invention. Unless otherwise specified, all parts and percentages are by weight.

EXAMPLE I

A

A dispersion of polymethyl methacrylate in hexane having 40% solids is prepared by standard techniques. This can be done by the process disclosed in U.S. Pat. Nos. 3,166,524 and 3,232,903. In a separate container, an aluminum flake mill base is prepared by mixing the following ingredients together:

171 parts Alcoa Aluminum Flake No. 226 (about 66-67% aluminum flake)
87 parts isooctyl benzyl phthalate
42 parts ethylene glycol monobutyl ether acetate This mill base contains 37% alumimum flake.

The two dispersions are combined with additional reactants in the following amounts:
1000 parts polymethyl methacrylate dispersion
40 parts aluminum flake mill base
120 parts isooctyl benzyl phthalate
140 parts diethylene glycol monobutyl ether The combined dispersion has an aluminum/binder ratio of 2.3/100 and a solids content of 42%. The dispersed phase comprises the polymethyl methacrylate and aluminum flake, nonsolvent volatile organic liquid is hexane, the coalescing solvents are the small amounts of ethylene glycol monobutyl ether acetate and diethylene glycol monobutyl ether present. The combined dispersion also contains some isooctyl benzyl phthalate which acts as a plasticizer. There is 0.35 part of coalescing solvent per part of dispersed polymer present in the dispersion.

This combined dispersion is sprayed onto a metal panel which is subsequently baked at 150° C. for thirty minutes. The panel is quite dark when viewed directly from a vertical position and remains quite dark when viewed at angles approaching +90° measured clockwise from the vertical. The two-tone ratio is 25.

B

Three hundred and twenty parts of ethylene glycol monobutyl ether acetate (coalescing solvent) is added and mixed in with the combined dispersion of Example I-A. The solids content is now 34% and there is present 1.16 parts of coalescing solvent per part of dispersed polymethyl methacrylate. The dispersion is sprayed onto a metal panel and the panel is subsequently baked at 150° C. for 30 minutes. The resulting dry metallic finish has considerable metallic glamor and is quite bright when viewed from a vertical position and becomes progressively darker when viewed from angles approaching +90° measured clockwise from the vertical. The two-tone ratio is 52.

Reducing the spray solids to 34% by adding additional hexane without adding any additional coalescing solvent does not result in any such marked increase in metallic glamor.

EXAMPLE II

The procedure of Example I is followed, except that 195 parts of ethylene glycol monobutyl ether acetate is added as the coalescing solvent of Example I-B. Panels coated with the dispersion before addition of the coalescing solvent and after such addition yield two-tone ratios of 24 and 42, respectively. Before addition, the ratio by weight of coalescing solvent to dispersed polymer is 0.35 and after addition of the coalescing solvent it is raised to 0.85.

EXAMPLE III

The procedure of Example I is followed, except that 195 parts of ethylene glycol monoethyl ether is used as the coalescing solvent of Example I-B. Panels coated with the dispersion before and after the addition of the coalescing solvent yield two-tone ratios of 24 and 35, respectively, and have coalescing solvent/dispersed polymer ratios of 0.35 and 0.85, respectively.

EXAMPLE IV

The procedure of Example I is followed, except that 1300 parts of a 50/50 weight percent solution of hexane nonsolvent volatile organic liquid/ethylene glycol monobutyl ether acetate coalescing solvent is used. Panels coated before addition of the coalescing solvent/hexane mixture have two-tone ratios of 28 and coalescing solvent/dispersed polymer ratios of 0.35, while panels coated after addition of the coalescing solvent have two-tone ratios of 55 and coalescing solvent/dispersion polymer ratios of 1.98. Diluting the coalescing solvent with hexane provides dispersions with lower solids contents which permits greater amounts of coalescing solvents to be added.

EXAMPLE V

The procedure of Example I is followed with the following modifications. The aluminum flake mill base is prepared from:
171 parts Metals Disintegrating Co. Aluminum Paste MD-587 (about 66-67% aluminum flake)
87 parts isobutyl benzyl phthalate
42 parts ethylene glycol monobutyl ether acetate It contains 37% aluminum solids by weight.

The aluminum flake mill base and polymethyl methacrylate dispersion are combined with additional reactants in the following amounts:
1000 parts polymethyl methacrylate dispersion
40 parts aluminum flake mill base
120 parts isooctyl benzyl phthalate
140 parts diethylene glycol monobutyl ether The combined dispersion has an aluminum/binder ratio of 2.3/100 and a solids content of 42%. The ratio of coalescing solvent to dispersed polymer is 0.35.

Coated panels have a two-tone ratio of 30. One hundred and ninety-five parts of ethylene glycol monobutyl ether acetate is added to the dispersion which reduces the solids content to 36.8% and raises the ratio of coalescing solvent/dispersed polymer to 0.85. The two-tone ratio of panels coated with this dispersion is 55.

EXAMPLE VI

The procedure of Example I is followed, except that the aluminum flake mill base is prepared from:
171 parts Alcoa Aluminum Paste No. 2290 (about 66-67% aluminum flake)
87 parts isooctyl benzyl phthalate
42 parts ethylene glycol monobutyl ether acetate This mill base contains 37% aluminum solids by weight. The combined aluminum flake mill base and polymethyl methacrylate dispersion has a ratio of coalescing solvent to dispersed polymer of 0.35.

The two-tone ratio of panels coated with this dispersion before the addition of a large amount of a coalescing solvent is 15. One hundred and four parts of ethylene glycol monobutyl ether acetate is added raising the ratio of coalescing solvent/dispersed polymer to 0.62, and the panels coated with this dispersion have a two-tone ratio of 20. Addition of 216 more parts of the coalescing solvent yields a coalescing solvent/dispersed polymer ratio of 1.16 and panels coated with this dispersion have two-tone ratios of 30.

EXAMPLE VII

The procedure of Examples I-VI is followed, except that the polymethyl methacrylate dispersion is replaced by a 40% solids dispersion of a copolymer containing 98 parts by weight of methyl methacrylate and 2 parts by weight of N,N-diethylaminoethyl methacrylate. The resulting two-tone ratios are the same as those previously shown in Examples I-VI.

What is claimed is:

1. In a metallic pigmented organosol composition having a dispersed phase of a polymer which is a homopolymer or copolymer of monomers selected from the group consisting of acrylic acid, methacrylic acid, esters of acrylic acid formed from alcohols having 1 through 18 carbon atoms, esters of methacrylic acid formed from alcohols having 1 through 18 carbon atoms, styrene, N-N-dimethylaminoethyl methacrylate, N-t-butylaminoethyl methacrylate and acrylonitrile and metallic flake pigmentation; the improvement comprising: a continuous phase of:
   (1) at least one volatile organic liquid present in an amount sufficient to keep said polymer in the dispersed phase, the volatile organic liquid being a nonsolvent for the dispersed phase; and
   (2) at least one coalescing solvent which is an organic liquid having a nonsolvent tolerance value of from about 20 to about 70 and an evaporation rate of less than about 0.5 times the evaporation rate of the volatile organic liquid, the coalescing solvent being present in an amount of from about 0.6 to about 2.5 parts by weight coalescing solvent per 1 part by weight of the dispersed polymer, the coalescing solvent being a solvent for the dispersed polymer and being miscible in the volatile organic liquid, said composition being capable of yielding a coating having metallic glamor upon the evaporation of the continuous phase.

2. The metallic pigmented organosol composition of claim 1 wherein the coalescing solvent has a nonsolvent tolerance value of from about 40 to about 60 and an evaporation rate of less than about 0.06 times the evaporation rate of the volatile organic liquid, said coalescing solvent being present in an amount of from about 1.2 to about 2.5 parts by weight coalescing solvent per parts by weight of said dispersed polymer.

3. The composition of claim 1 wherein the coalescing solvent comprises
   2,2,4-trimethylpentane-1,3-diol monoisobutyrate monoacetate,
   diethylene glycol monobutyl ether,
   ethylene glycol monoethyl ether,
   diethylene glycol monobutyl ether acetate,
   ethylene glycol monobutyl ether acetate,
   ethylene glycol monoethyl ether acetate,
   acetone,
   or mixtures of the foregoing.

4. The composition of claim 2 wherein the coalescing solvent comprises
   2,2,4-trimethylpentane-1,3-diol monoisobutyrate monoacetate,
   diethylene glycol monobutyl ether,
   ethylene glycol monoethyl ether,
   diethylene glycol monobutyl ether acetate,
   ethylene glycol monobutyl ether acetate,
   ethylene glycol monoethyl ether acetate,
   acetone,
   or mixtures of the foregoing.

5. The composition of claim 2 containing plasticizer.

* * * * *